(12) United States Patent
Zhou et al.

(10) Patent No.: US 7,961,738 B2
(45) Date of Patent: Jun. 14, 2011

(54) METHOD FOR ACCESSING VIRTUAL PRIVATE NETWORK, VIRTUAL PRIVATE SYSTEM, VIRTUAL PRIVATE NETWORK AND PROVIDER EDGE DEVICE THEREOF

(75) Inventors: Peng Zhou, Shenzhen (CN); Chunzhe Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 189 days.

(21) Appl. No.: 12/328,972

(22) Filed: Dec. 5, 2008

(65) Prior Publication Data

US 2009/0080438 A1 Mar. 26, 2009

Related U.S. Application Data

(63) Continuation of application No. PCT/CN2007/070091, filed on Jun. 7, 2007.

(30) Foreign Application Priority Data

Jun. 7, 2006 (CN) .......................... 2006 1 0083867

(51) Int. Cl.
*H04L 12/28* (2006.01)
(52) U.S. Cl. .................................. 370/395.53; 370/397
(58) Field of Classification Search ........................ None
See application file for complete search history.

(56) References Cited

U.S. PATENT DOCUMENTS

| | | | | |
|---|---|---|---|---|
| 7,643,409 B2* | 1/2010 | Voit et al. | ....................... | 370/218 |
| 7,644,317 B1* | 1/2010 | Sajassi et al. | .................... | 714/43 |
| 7,715,310 B1* | 5/2010 | Sajassi et al. | ................. | 370/219 |
| 2004/0081172 A1 | 4/2004 | Ould-Brahim | | |
| 2004/0095940 A1 | 5/2004 | Yuan et al. | | |

(Continued)

FOREIGN PATENT DOCUMENTS

CN 1625176 A 6/2005

(Continued)

OTHER PUBLICATIONS

State Intellectual Property Office of the People's Republic of China, Examination Report in Chinese Patent Application No. 200610083867.3 (Feb. 6, 2009).

(Continued)

*Primary Examiner* — Jayanti K Patel
*Assistant Examiner* — Hooman Houshmand
(74) *Attorney, Agent, or Firm* — Leydig, Voit & Mayer, Ltd.

(57) ABSTRACT

A method for accessing VPN using PW Emulation Edge-to-Edge Virtual Leased Line includes: configuring a first PW ID in a first Provider Edge Device that hosts a VSI, and an IP address of a second Provider Edge Device that hosts an PW Emulation Edge-to-Edge Virtual Leased Line associated with the PW ID; sending a second PW ID of the second Provider Edge Device to the first Provider Edge Device; determining whether the second PW ID of the second Provider Edge Device matches the first PW ID of the first Provider Edge Device, if it matches, setting the state of the PW between the first Provider Edge Device and the second Provider Edge Device; delivering a Forwarding Table by the first Provider Edge Device; establishing a bi-directional connection between the PW Emulation Edge-to-Edge Virtual Leased Line and the VSI. A Virtual Private System, a first Provider Edge Device, and a second Provider Edge Device are also provided.

26 Claims, 3 Drawing Sheets

U.S. PATENT DOCUMENTS

| | | |
|---|---|---|
| 2005/0190757 A1 | 9/2005 | Sajassi |
| 2005/0271036 A1* | 12/2005 | Cohen et al. .................. 370/351 |
| 2006/0018300 A1 | 1/2006 | Westberg et al. |
| 2006/0047851 A1* | 3/2006 | Voit et al. ...................... 709/239 |
| 2007/0008982 A1* | 1/2007 | Voit et al. ...................... 370/401 |

FOREIGN PATENT DOCUMENTS

| | | |
|---|---|---|
| CN | 1714544 A | 12/2005 |
| WO | WO 2006/004461 A1 | 1/2006 |

OTHER PUBLICATIONS

Lasserre et al. (eds), "Virtual Private LAN Services over MPLS," Internet Engineering Task Force (IETF), L2VPN Working Group, Internet Draft Document (draft-ietf-l2vpn-vpls-ldp-08.txt) (Nov. 2005), pp. 1-26.

* cited by examiner

METHOD FOR ACCESSING VIRTUAL PRIVATE NETWORK, VIRTUAL PRIVATE SYSTEM, VIRTUAL PRIVATE NETWORK AND PROVIDER EDGE DEVICE THEREOF

CROSS-REFERENCE TO RELATED APPLICATIONS

This application is a continuation of International Patent Application No. PCT/CN2007/070091, filed Jun. 7, 2007, which claims priority to Chinese Patent Application No. 200610083867.3, filed Jun. 7, 2006, both of which are hereby incorporated by reference in their entirety.

FIELD OF THE INVENTION

The present invention relates to Virtual Private Network, and, more particularly, relates to a method for accessing Virtual Private Network using Pseudo Wire Emulation Edge-to-Edge Virtual Leased Line, a Virtual Private System, and a Virtual Private Network and a Provider Edge Device thereof.

BACKGROUND

Initially, telecommunication operators provide links to users through Leased Lines. However, when the branches of the users increase, the cost of Leased Lines augments dramatically, and the management difficulty also increases continuously.

Along with the appearance of an Asynchronous Transport Mode (ATM) technique and a Frame Relay (FR) technique, telecommunication operators begin to provide Point-to-Point Layer 2 links to users through virtual circuit. The users then build their own Layer 3 networks thereon to bear data streams, such as Internet Protocol (IP). The links provided by this technique are all Point-to-Point Layer 2 links, and the configurations are rather complex. Especially when a new site is added, the administrator needs to do a lot of configurations.

A technique for providing Private Network (VPN) over IP network is developed to overcome the drawbacks of the above techniques. In this technique, it is convenient to set rates arbitrarily, and configuration is easy. This technique is Multiple Protocol Label Switch (MPLS) VPN. The MPLS based VPN service has two types: one is Layer 3 (L3) MPLS VPN and the other is Layer 2 (L2) MPLS VPN. L2MPLS VPN includes Virtual Private LAN Service (VPLS) and Virtual Leased Line (VLL). VLL is only adapted for Point-to-Point networking application mode, while VPLS is able to implement Multipoint-to-Multipoint VPN networking. VPLS provides a more adaptable solution for the operators that use Point-to-Point L2 VPN Services. In the VPLS intervention, the internal route layers of the users to L3 VPN may be avoided. The operators can manage and operate only one network, while providing a lot of services, such as Best-effort IP Service, L3 VPN, L2 VPN, Traffic Engineering, and Differentiated Service simultaneously on one network. Accordingly, the fee on build, maintenance, and operation is decreased.

VPLS provides a service on a MPLS network that is similar to Local Area Network (LAN) Service. VPLS allows users to access the network and access each other from a plurality of geographical dispersed points simultaneously, just like these points directly access a LAN. VPLS enables the users to extend from LAN to Metropolitan Area Network (MAN), even to Wide Area Network (WAN).

VPLS forwards Ethernet Packets via Medium Access Control (MAC) addresses. For a packet flooding that cannot be addressed with MAC addresses, this packet is forwarded to all of the ports belonging to a LAN, except for the port that receives the packet. When a packet enters a port, the correspondence relationship between the source MAC address of the packet and the entered port is learned. When the MAC address of the received packet is a broadcast address or a multicast address, the packet is flooded to other ports.

VPLS includes a plurality of Provider Edge Devices (PE), which provide one or more Pseudo Wires (PW) to the connected Customer Edges (CE), so that CEs can communicate with each other on VPLS. VPLS emulates a PW as an Ethernet Port, and learns the correspondence relationship between the source MAC address and the PW.

Label Distribute Protocol (LDP) based VPLS (LDP VPLS) is consistent with Pseudo Wire Emulation Edge-to-Edge (PWE3) on building PW signaling, and is substantially the same on forwarding actions. Therefore, the PWE3 and LDP VPLS can intercommunicate when building a PW; that is, a PWE3 instance on a PE can build a PW with a VPLS instance on another PE, so as to implement intercommunication.

However, in VPLS, PW ID is the VPN ID, which is used to identify a VPN. Therefore, all of the PWs in a Virtual Switch Instance (VSI, a VPLS VPN instance on a PE) have the same PW ID. Two PWE3 PWs may not have the same PW ID, especially when the two PWE3s are on the same PE. The PWE3 PWs that have the same package types need to have different PW IDs. Thus, a VSI is not able to access a plurality of PWE3 VLLs with different PW IDs simultaneously. In an existent network that operates PWE3 service, for connecting PWE3 to VPLS, the configuration of PWE3 needs to be modified so as to keep the PW IDs in PWE3 be consistent with the PW IDs in VSI. Since the modification impacts the existent services, even it cannot be realized through reconfiguration.

Additionally, a VPLS VPN is comprised of VSIs on a plurality of PEs, and these VSIs have the same VPN ID. According to the existing solutions, a plurality of PWE3 VLLs that have different PW IDs cannot be connected to one VPLS VPN.

Furthermore, PWEs is Point-to-Point, and connecting one PE with a plurality of other PEs simultaneously cannot be established. Therefore, the full-mesh topology of PEs, which is required by VPLS Service, is not ensured, and a complete VPLS Service cannot be provided.

SUMMARY

Embodiments of the present invention provide a method for accessing VPN. The method includes: configuring a first PW ID of a first Provider Edge Device that hosts a VSI, and an IP address in a second Provider Edge Device that hosts a PW Emulation Edge-to-Edge Virtual Leased Line associated with the PW ID; sending, by the second Provider Edge Device, the second PW ID of the second Provider Edge Device to the first Provider Edge Device; determining, by the first Provider Edge Device, whether the second PW ID of the second Provider Edge Device matches the first PW ID of the first Provider Edge Device, and, if it matches, the state of PW between the first Provider Edge Device and the second Provider Edge Device transforms from DOWN to UP, and the state of VSI transforms to UP; delivering, by the first Provider Edge Device, a Forwarding Table; and establishing, by the PW Emulation Edge-to-Edge Virtual Leased Line, a bi-directional connection with the VSI, according to the Forwarding Table.

Embodiments of the present invention provide a method for accessing VPN. The method includes: configuring a first PW ID in a first Provider Edge Device that hosts a Virtual Switch Instance (VSI), and an IP address of a second Provider Edge Device that hosts the PW Emulation Edge-to-Edge Virtual Leased Line associated with the first PW ID; receiving a second PW ID of the second Provider Edge Device from the second Provider Edge Device; determining whether the second PW ID of the second Provider Edge Device matches the first PW ID of the first Provider Edge Device, and, if it matches, setting the state of the PW between the first Provider Edge Device and the second Provider Edge Device; and sending a Forwarding Table to the PW Emulation Edge-to-Edge Virtual Leased Line, to build a bi-directional connection with the VSI.

Embodiments of the present invention also provide a Virtual Private System. According to the embodiment, a first Provider Edge Device that hosts a VSI configures PW IDs, and a plurality of PWE3 VLLs can access the VSI; accordingly, a Virtual Private System is constructed.

Embodiments of the present invention provide a Virtual Private System including: at least one first Provider Edge Device that hosts a VSI and at least one second Provider Edge Device that hosts a PW Emulation Edge-to-Edge Virtual Leased Line, a first PW ID of the first Provider Edge Device and a second PW ID of the second Provider Edge Device is matched, the state of the PW between the first Provider Edge Device and the second Provider Edge Device is set according to the matching results, and a bi-directional connection is established on the basis of a Forwarding Table sent down by the first Provider Edge Device.

Embodiments of the present invention also provide a Virtual Private Network, including a plurality of VSIs resident on first Provider Edge Devices. The first Provider Edge Device configures PW IDs and IP address of a second Provider Edge Device that hosts a PW Emulation Edge-to-Edge Virtual Leased Line, determines whether the PW IDs are matched, sets the state of the PWs, and sends down a Forwarding Table.

Embodiments of the present invention further provide a Provider Edge Device, including: an accessing unit adapted to connect a User Edge Device to a Private Network; and a processing unit adapted to configure PW IDs and IP address of a second Provider Edge Device that hosts a PW Emulation Edge-to-Edge Virtual Leased Line, determine whether the PW IDs are matched, set the state of the PWs, and deliver a Forwarding Table.

DETAILED DESCRIPTION

The embodiments of the present invention are described hereinafter in conjunction with the accompany drawings.

Figure 1:
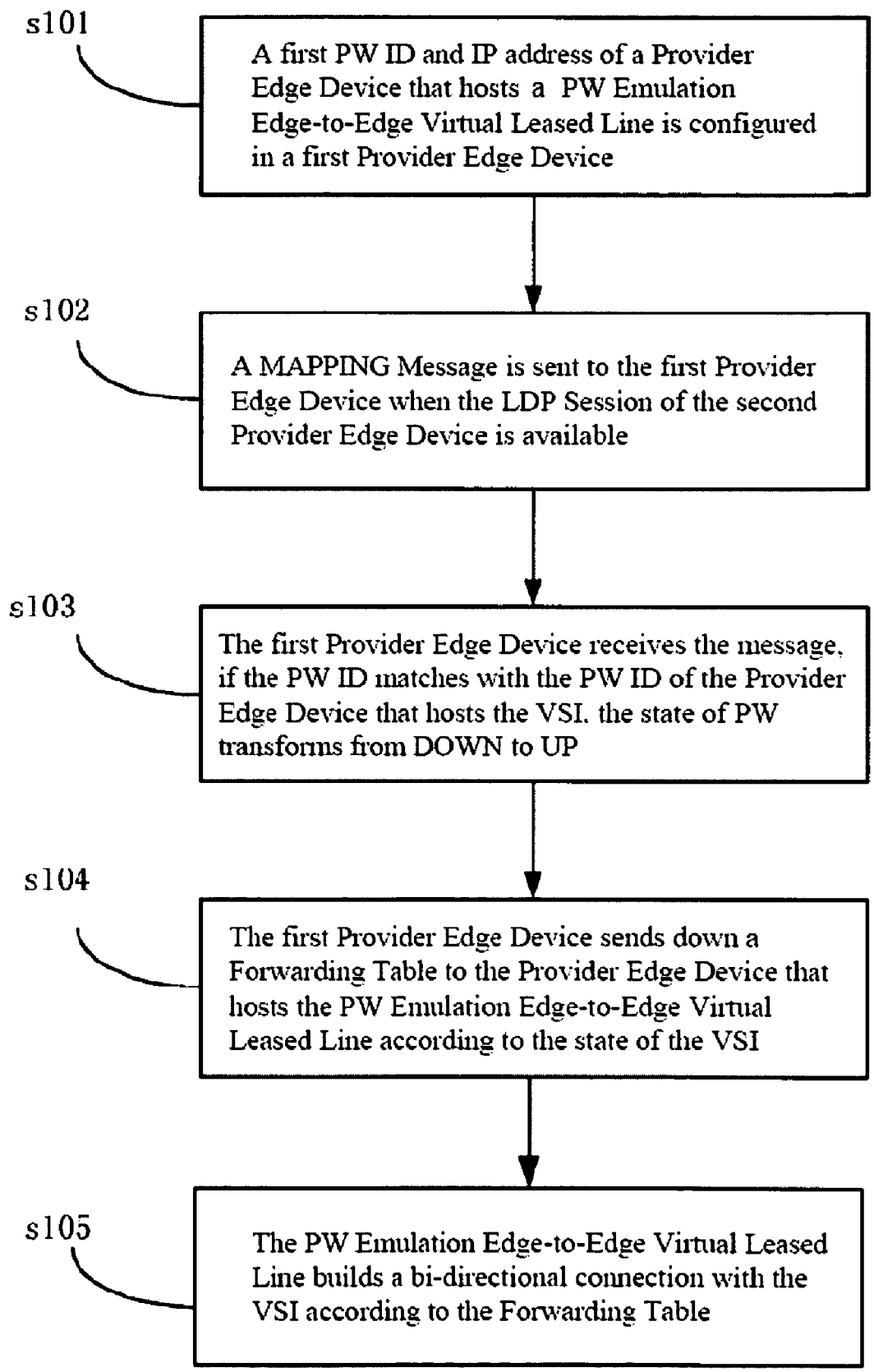
FIG. 1 illustrates a flowchart of a method for Pseudo Wire Emulation Edge-to-Edge Virtual Leased Line connecting to Virtual Private Network, according to the embodiments of the present invention.

Embodiments of the present invention provide a method for accessing Virtual Private Network using Pseudo Wire Emulation Edge-to-Edge Virtual Leased Line. As shown in FIG. 1, the method includes:

Step s101: When establishing a PW between a Provider Edge Device that hosts a VSI and a Provider Edge Device that hosts a Pseudo Wire Emulation Edge-to-Edge Virtual Leased Line, a first PW ID and IP address of a second Provider Edge Device that hosts a Pseudo Wire Emulation Edge-to-Edge Virtual Leased Line is configured in a first Provider Edge Device that hosts a VSI. The first PW ID is set according to a specified rule; that is, the specified first PW ID is different with the IDs used by other VSIs on the first Provider Edge Device, and is different with the other PW IDs assigned by the first Provider Edge Device.

Step s102: When the Provider Edge Device State that hosts the Pseudo Wire Emulation Edge-to-Edge Virtual Leased Line finishes the configuration of the second PW ID mentioned in Step s101 and the IP address of the Provider Edge Device that hosts the VSI, and when a LDP Session of the Provider Edge Device that hosts the Pseudo Wire Emulation Edge-to-Edge Virtual Leased Line is available, a MAPPING Message is sent to the Provider Edge Device that hosts the VSI, and the MAPPING Message is processed according to draft-ietf-12vpn-vpls-ldp protocol. The availability of the LDP Session is determined by inquiring a LDP (Label Distribution Protocol) Table of the Provider Edge Device that hosts the VSI; when a session identifier exists in the LDP Table and the state of the identifier is UP, the session is available; otherwise, the session is unavailable.

When configuring the second PW ID, the configuration conditions of the second PW ID are the same as the definition in Step s101.

Step s103: When the Provider Edge Device that hosts the VSI receives the message and the second PW ID in the message matches the first PW ID of the Provider Edge Device that hosts the VSI, the state of PW transforms from DOWN to UP. PW includes Spoke PW and Hub PW; when at least two Attachment Circuits or Spoke PWs are UP, or at least one Attachment Circuit/Spoke PW and a Hub PW are UP, the state of VSI is set to UP; otherwise, the state of VSI is set to DOWN.

Step s104: The Provider Edge Device that hosts the VSI sends down a Forwarding Table to the Provider Edge Device that hosts the Pseudo Wire Emulation Edge-to-Edge Virtual Leased Line. The Forwarding Table includes information such as destination address, source address, route, etc. A control layer of a PE device sends down the Forwarding Table to a forward layer. When the state of VSI transforms from UP to DOWN, the Forwarding Table is deleted.

Step s105: The Pseudo Wire Emulation Edge-to-Edge Virtual Leased Line builds a bi-directional connection with the VSI, according to the information of the Forwarding Table.

Figure 2:
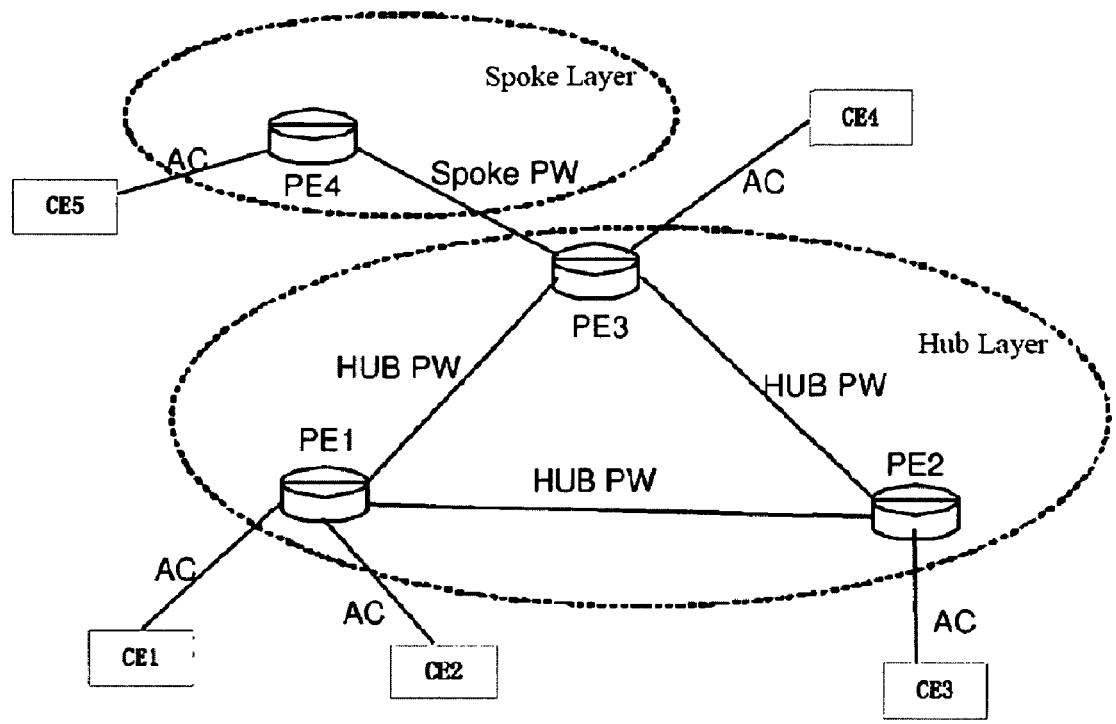
FIG. 2 illustrates the structure of a HVPLS constructed, according to an embodiment of the present invention.

Additionally, PWE3 VLLs which access the VPLS according to the above method regard the PWs as Spoke PWs in VSI. These Spoke PWs and the Hub PWs of VPLS form a HVPLS structure. As shown in FIG. 2, Hub PWs are built among PE1, PE2, and PE3 to form the Hub layer of VPLS. Spoke PWs are built between PE4 and PE3 to form the Spoke layer of VPLS. The Spoke PWs do not enable split-horizon function, and the building of the Spoke PWs between VPLS and PWE3 VLL does not rely on an UP state of other ACs (Attachment Circuit).

The embodiment of present invention configures a plurality of different PW IDs in a VSI, when Pseudo Wire Emulation Edge-to-Edge Virtual Leased Lines having different PW IDs access the VSI, each of the Leased Lines can find a matched PW ID, respectively; thus, to implement the simultaneous access of multiple PWE3 VLLs to one VSI.

Figure 3:
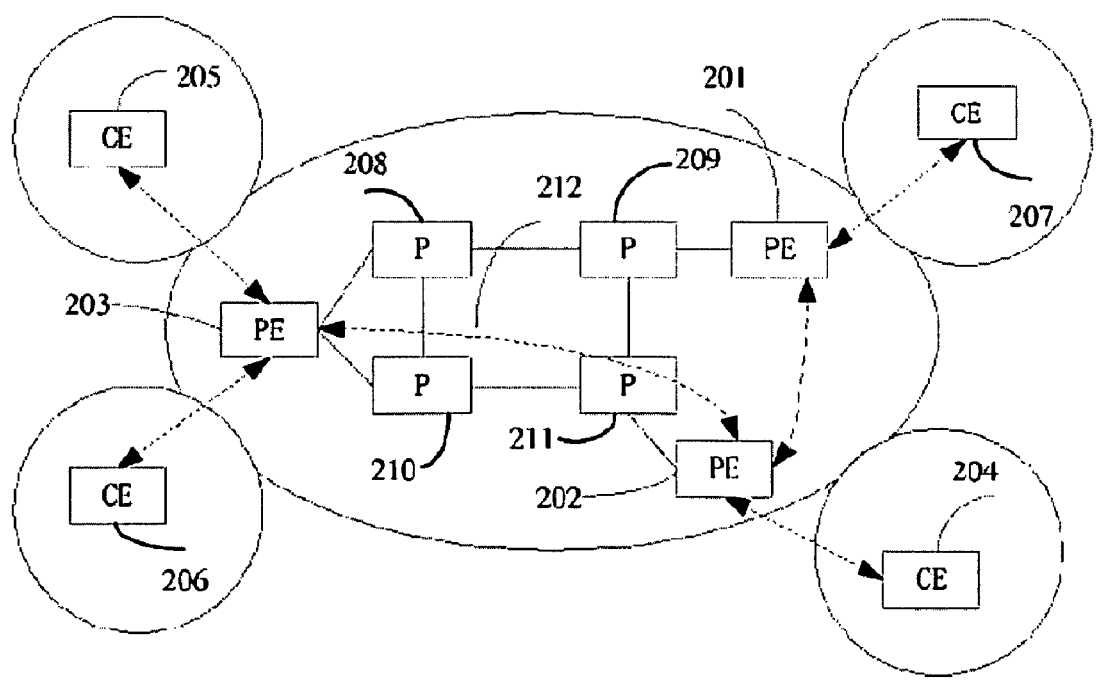
FIG. 3 is a schematic diagram of a Virtual Private System, according to the embodiments of the present invention.

The following embodiments of the present invention provide a Virtual Private System for implementing Pseudo Wire Emulation Edge-to-Edge Virtual Leased Line accessing Virtual Private Network. As shown in FIG. 3, the Virtual Private System includes: Provider Edge Device PE 201, PE 202 and PE 203; Provider Device P 208, P209, P210 and P 211; User Edge Device CE 204, CE 205, CE 206 and CE 207. In the embodiment, the CE 205 and CE 206 access the Private Network through PE 203, CE 207 accesses the Private Network through PE 201, CE 204 access the Private Network through PE 202. Within the Private Network, PE 201, PE 202 and PE 203 communicate with each other through P208, P209, P210 and P 211. In this system, PE 201 and PE 202 are the second Provider Edge Devices that host the Pseudo Wire Emulation Edge-to-Edge Virtual Leased Lines PWE3 VLLs, and PE 203 is the first Provider Edge Device that hosts the VSI. Two VSIs exist on PE 203, which means two VPNs, VPN A and VPN B.

It is assumed that two PWE3 VLLs with different PW IDs on PE 202 will access VPN B on PE 203. First, two PW IDs (Y1 and Y2, wherein Y1 is different with Y2) that correspond to the PW IDs of the PWE3 VLLs are configured on PE 203, the IP address of PE 202 is also configured, wherein Y1 can be the VSI ID of VPN B. When the LDP Session of PE 202 is available, a MAPPING Message is sent to PE 203. When PE 203 receives the MAPPING Message sent by one of the PWE3 VLLs on PE 202, if the PW ID in the message matches the PW ID configured by the Provider Edge Device that hosts the VSI PE 203, the state of the PWE3 VLL transforms from DOWN to UP, and PE 203 sends a Forwarding Table to PE 202. The PWE3 VLL on PE 202 accesses the VSI on PE 203, according to the Forwarding Table. Similarly, the other PWE3 VLL on PE 202 is also able to access the VSI on PE 203.

Similarly, it is assumed that two PWE3 VLLs with different PW IDs on PE 202 will access VPN A on PE 203, and one PWE3 VLL on PE 201 will access VPN A on PE 203. First, three PW IDs (X1, X2, and X3, wherein X1, X2, and X3 are different from each other and are different from Y1 and Y2) that correspond to the PW IDs of the above three PWE3 VLLs are configured on PE 203, and the IP addresses of PE 201 and PE 202 are also configured, wherein X1 can be the VSI ID of VPN A. When a LDP Session of PE 201 or PE 202 is available, a MAPPING Message is sent to PE 203. When PE 203 receives the MAPPING Message sent by one of the PWE3 VLLs on PE 201 or PE 202, if the PW ID in the message matches the PW ID configured by the Provider Edge Device that hosts the VSI PE 203, the state of the PWE3 VLL transforms from DOWN to UP, and PE 203 sends a Forwarding Table to PE 201 or PE 202. The PWE3 VLL on PE 201 or PE 202 accesses the VSI on PE 203, according to the Forwarding Table.

Figure 4:
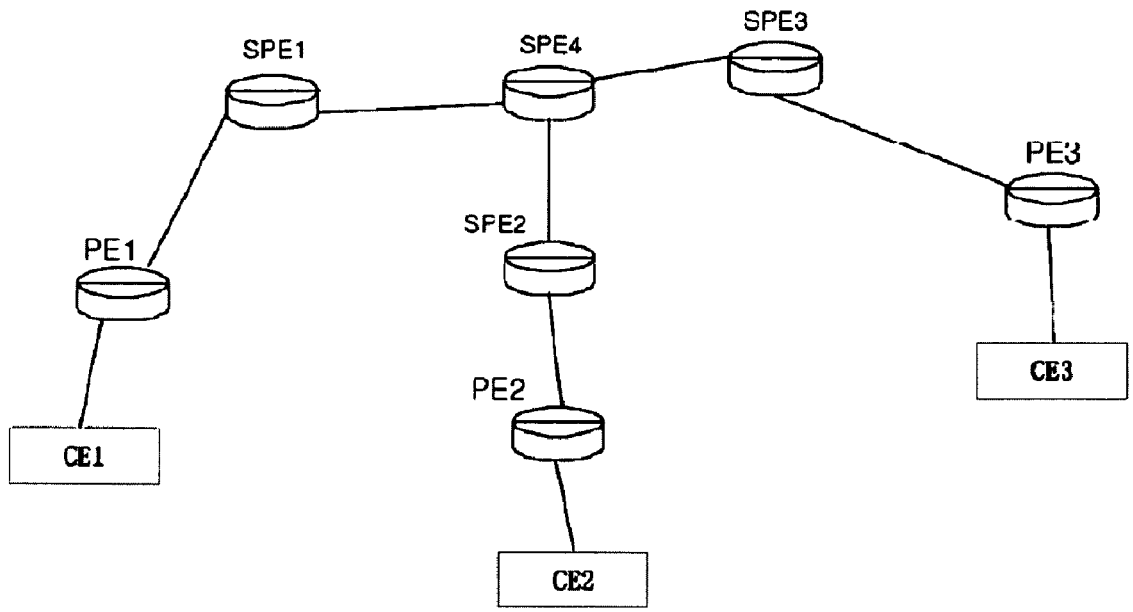
FIG. 4 illustrates the structure of Multihop Pseudo Wire Emulation Edge-to-Edge Virtual Leased Line accessing Virtual Private Network utilizing SPE, according to the embodiments of the present invention.

Considering the scalability problem caused by the increased number of the PE-to-PE signaling sessions and PSN tunnels in the backbone network, SPE (Superstratum PE) is introduced to the embodiments of the present invention. PEs build PW connections with SPEs, respectively, so that the Edge-to-Edge connections between PEs become connections relayed by one or more SPEs. The relay of SPEs reduces the number of the mesh connections between PEs. The detailed structure is illustrated by FIG. 4, PE1, PE2, and PE3 are terminal PWE3 of VPLS, respectively, and may have different PW IDs. The intermediate switch nodes SPE1, SPE2, and SPE3 use PWE3 Multihop to connect. It is assumed that PE1 is the Provider Edge Device that hosts the VSI, and PE2 and PE3 are Provider Edge Devices that host Pseudo Wire Emulation Edge-to-Edge Virtual Leased Line PWE3 VLLs S1 and S2, respectively. First, two different PW IDs, PW ID S1 and PW ID S2, which correspond to the Pseudo Wire Emulation Edge-to-Edge Virtual Leased Line PWE3 VLLs S1 and S2, are configured in PE1. When the LDP Session of PE2 is available, a MAPPING message is sent to PE1 through SPE2, SPE4, and SPE1 orderly. After PE1 receives the message, if PE1 determines that the PW ID of the Pseudo Wire Emulation Edge-to-Edge Virtual Leased Line matches the PW ID of itself, then, PE1 creates and sends a Forwarding Table to the Provider Edge Device that hosts the Pseudo Wire Emulation Edge-to-Edge Virtual Leased Line, so that the Provider Edge Device PE2 that hosts the Pseudo Wire Emulation Edge-to-Edge Virtual Leased Line S1 can build a bi-directional connection with the Provider Edge Device PE1 that hosts the VSI. Similarly, the Provider Edge Device PE3 that hosts the Pseudo Wire Emulation Edge-to-Edge Virtual Leased Line S2 builds a bi-directional connection with the Provider Edge Device PE1 that hosts the VSI. Under the original networking mode, on accessing nodes, the number of the LDP Sessions and LSP for the whole network is $n*(n-1)/2$, wherein n is the number of the PEs and has a magnitude of N2. If Multihop is used, the number of the LDP Sessions and LSP for the whole network is $n-1$ (one of the n PEs is SPE, each one of the other $n-1$ PEs connects a LSP to SPE, $n-1$ LSPs in total). The scalability of the network is greatly improved.

The following embodiments of the present invention provide a first Provider Edge Device that hosts the VSI, including: an accessing unit 1 that connects the Edge Device to the Private Network; a processing unit 2 that configures PW IDs and IP address of the second Provider Edge Device that hosts Pseudo Wire Emulation Edge-to-Edge Virtual Leased Lines, determines whether the PW IDs are matched, sets the state of the PW, and delivers a Forwarding Table. The first Provider Edge Device configures a plurality of PW IDs in the VSI, when Pseudo Wire Emulation Edge-to-Edge Virtual Leased Lines having different PW IDs access the VSI, each of the Leased Lines can find a matched PW ID, respectively; thus, to implement the simultaneous access of multiple PWE3 VLLs to one VSI.

Figure 5:
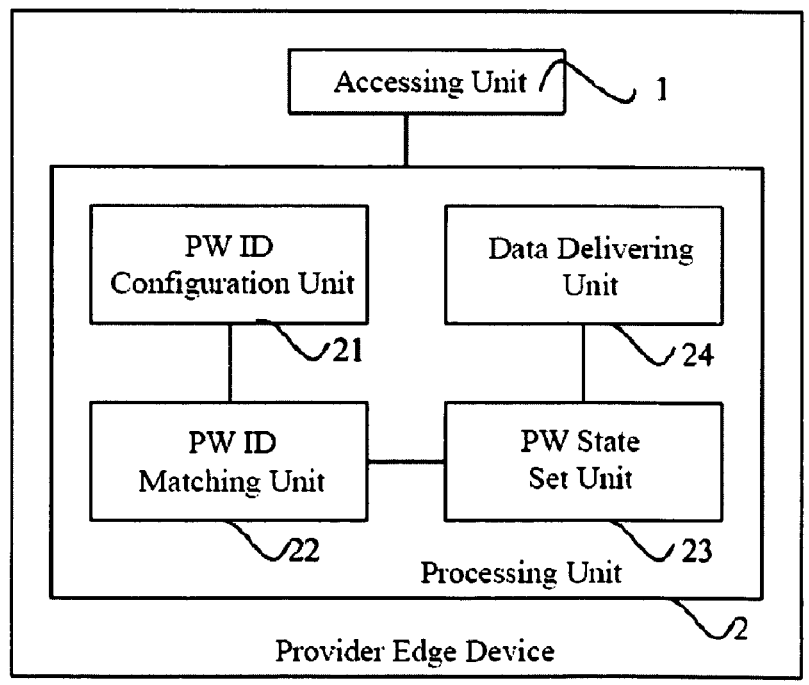
FIG. 5 is a schematic diagram of a Provider Edge Device, according to the embodiments of the present invention.

As shown in FIG. 5, it is a schematic diagram of the first Provider Edge Device according to the embodiments of the present invention, and the processing unit 2 includes: a PW ID configuration unit 21 adapted to configure PW ID for a PW, and set an IP address of the second Provider Edge Device that hosts the Pseudo Wire Emulation Edge-to-Edge Virtual Leased Line corresponding to the PW; a PW ID matching unit 22 adapted to determine whether the PW ID matches with the PW ID carried in the received message; a PW state set unit 23 adapted to set the state of the PW, according to the match result; and a data delivering unit 24 adapted to deliver a Forwarding Table, according to the state of the PW.

The VPLS VPN provided by the embodiments of the present invention is comprised of VSIs on a plurality of Provider Edge Devices, wherein a first Provider Edge Device configures PW IDs and IP address of a second Provider Edge Device that hosts the Pseudo Wire Emulation Edge-to-Edge Virtual Leased Line, determines whether the PW IDs are matched, sets the state of the PW, and sends down a Forwarding Table. The structure of PE is the same as the structure shown in FIG. 5. The Virtual Private Network constructed by the above structures can carry out the access of multiple Pseudo Wire Emulation Edge-to-Edge Virtual Leased Lines having different PW IDs to the same VPLS VPN.

The embodiments of the present invention configures the PW ID of a VSI and associates it with PWE3 PW, so that a PWE3 VLL can access a VPLS VPN when the PWE3 VLL has a different PW ID; further, the access of a plurality of PWE3 VLLs having different PW IDs to one VPLS VPN is able to be implemented. The PWE3 VLLs can be resided on different PEs, or on the same PE but having different PW IDs.

Additionally, because a plurality of PWE3 VLLs that have the same or different PW IDs can connect to one VSI, the interconnection between any two PE nodes is ensured and the full-mesh topology of PEs is realized.

The foregoing teachings are merely a number of preferred embodiments of the present invention. It shall be noted that several improvements and modifications can be made by the ordinary people skilled in the art without departing from the principle of the present invention. These improvements and modifications shall be construed as being within the scope of protection of the present invention.

What is claimed is:

1. A method for accessing a Virtual Private Network (VPN) using a Pseudo Wire (PW) Emulation Edge-to-Edge Virtual Leased Line, comprising:

configuring a first PW identification (ID) in a first Provider Edge Device that hosts a Virtual Switch Instance (VSI), and an Internet Protocol (IP) address of a second Provider Edge Device that hosts the PW Emulation Edge-to-Edge Virtual Leased Line associated with the first PW ID;

wherein the first PW ID is an ID specified by the first Provider Edge Device, and the ID specified for a PW is set to be different from the IDs of other VSIs on the first Provider Edge Device, and is set to be different from other PW IDs assigned by the VSI on the first Provider Edge Device;

sending, by the second Provider Edge Device, a second PW ID of the second Provider Edge Device to the first Provider Edge Device;

determining, by the first Provider Edge Device, whether the second PW ID of the second Provider Edge Device matches the first PW ID of the first Provider Edge Device, if it matches, setting a state of a PW between the first Provider Edge Device and the second Provider Edge Device; and building, by the PW Emulation Edge-to-Edge Virtual Leased Line, a bi-directional connection with the VSI according to the Forwarding Table sent by the first Provider Edge Device.

2. The method of claim 1, wherein the state of PW comprises a state of Spoke PW and a state of Hub PW.

3. The method of claim 2, wherein setting the state of the PW between the first Provider Edge Device and the second Provider Edge Device comprises:

setting the state of PW from DOWN to UP so as to change the state of VSI to UP.

4. The method of claim 3, wherein the UP state of VSI is determined when the following conditions are met:

the states of at least two Attachment Circuits or at least two Spoke PWs are UP; or the state of at least one Attachment Circuit/Spoke PW and one Hub PW is UP.

5. The method of claim 4, further comprising: deleting the Forwarding Table when the state of VSI transforms from UP to DOWN.

6. The method of claim 5, wherein sending, by the second Provider Edge Device, a second PW ID of the second Provider Edge Device to the first Provider Edge Device comprises:

determining, by the second Provider Device according to an LDP Table of the first Provider Edge Device, an LDP Session is available, and sending the second PW ID of the second Provider Edge Device to the first Provider Edge Device.

7. The method of claim 6, wherein determining the LDP Session is available according to the LDP Table of the first Provider Edge Device comprises:

learning the existence of a Session ID within the LDP Table, and the state of the Session ID being UP, and determining the LDP Session is available.

8. The method of claim 7, wherein sending the second PW ID of the Second Provider Edge Device to the first Provider Edge Device comprises:

sending a MAPPING Message that carries the PW ID of the second Provider Edge Device to the first Provider Edge Device through an intermediate switch node.

9. The method of claim 4, wherein sending, by the second Provider Edge Device, a second PW ID of the second Provider Edge Device to the first Provider Edge Device comprises:

determining, by the second Provider Device according to an LDP Table of the first Provider Edge Device, an LDP Session is available, and sending the second PW ID of the second Provider Edge Device to the first Provider Edge Device.

10. The method of claim 9, wherein determining the LDP Session is available according to the LDP Table of the first Provider Edge Device comprises:

learning the existence of a Session ID within the LDP Table, and the state of the Session ID being UP, and determining the LDP Session is available.

11. The method of claim 10, wherein sending the second PW ID of the Second Provider Edge Device to the first Provider Edge Device comprises:

sending a MAPPING Message that carries the PW ID of the second Provider Edge Device to the first Provider Edge Device through an intermediate switch node.

12. The method of claim 4, wherein between configuring the first Pseudo Wire (PW) identification (ID) and the Internet Protocol (IP) address of a second Provider Edge Device that hosts a PW Emulation Edge-to-Edge Virtual Leased Line associated with the PW ID in the first Provider Edge Device, and sending a MAPPING message to the first Provider Edge Device by the second Provider Edge Device, the method further comprises:

configuring, by the second Provider Edge Device, a second PW ID and an IP address of the first Provider Edge Device that hosts the Virtual Switch Instance (VSI).

13. The method of claim 3, wherein sending, by the second Provider Edge Device, a second PW ID of the second Provider Edge Device to the first Provider Edge Device comprises:

determining, by the second Provider Device according to an LDP Table of the first Provider Edge Device, an LDP Session is available, and sending the second PW ID of the second Provider Edge Device to the first Provider Edge Device.

14. The method of claim 13, wherein determining the LDP Session is available according to the LDP Table of the first Provider Edge Device comprises:

learning the existence of a Session ID within the LDP Table, and the state of the Session ID being UP, and determining the LDP Session is available.

15. The method of claim 14, wherein sending the second PW ID of the Second Provider Edge Device to the first Provider Edge Device comprises:

sending a MAPPING Message that carries the PW ID of the second Provider Edge Device to the first Provider Edge Device through an intermediate switch node.

16. The method of claim 3, wherein between configuring the first PW ID and the IP address of a second Provider Edge Device that hosts a PW Emulation Edge-to-Edge Virtual Leased Line associated with the PW ID in the first Provider Edge Device, and sending a MAPPING message to the first Provider Edge Device by the second Provider Edge Device, the method further comprises:
configuring, by the second Provider Edge Device, a second PW ID and an IP address of the first Provider Edge Device that hosts the VSI.

17. The method of claim 2, wherein sending, by the second Provider Edge Device, a second PW ID of the second Provider Edge Device to the first Provider Edge Device comprises:
determining, by the second Provider Device according to an LDP Table of the first Provider Edge Device, an LDP Session is available, and sending the second PW ID of the second Provider Edge Device to the first Provider Edge Device.

18. The method of claim 17, wherein determining the LDP Session is available according to the LDP Table of the first Provider Edge Device comprises:
learning the existence of a Session ID within the LDP Table, and the state of the Session ID being UP, and determining the LDP Session is available.

19. The method of claim 18, wherein sending the second PW ID of the Second Provider Edge Device to the first Provider Edge Device comprises:
sending a MAPPING Message that carries the PW ID of the second Provider Edge Device to the first Provider Edge Device through an intermediate switch node.

20. The method of claim 2, wherein between configuring the first PW ID and the IP address of a second Provider Edge Device that hosts a PW Emulation Edge-to-Edge Virtual Leased Line associated with the PW ID in the first Provider Edge Device, and sending a MAPPING message to the first Provider Edge Device by the second Provider Edge Device, the method further comprises:
configuring, by the second Provider Edge Device, a second PW ID and an IP address of the first Provider Edge Device that hosts the VSI.

21. A Virtual Private System, comprising a first Provider Edge Device that hosts at least one Virtual Switch Instance (VSI) and a second Provider Edge Device that hosts at least one Pseudo Wire (PW) Emulation Edge-to-Edge Virtual Leased Line,
a first PW identification (ID) of the first Provider Edge Device and a second PW ID of the second Provider Edge Device are matched;
wherein the first PW ID is an ID specified by the first Provider Edge Device, and the ID specified for a PW is set to be different from the IDs of other VSIs on the first Provider Edge Device, and is set to be different from other PW IDs assigned by the VSI on the first Provider Edge Device;
state of the PW between the first Provider Edge Device and the second Provider Edge Device is set according to the result of matching; and
a bi-directional connection according to the Forwarding Table sent by the first Provider Edge Device is established.

22. The system of claim 21, further comprising:
at least one mediate switch node, adapted to forward the second PW ID of the second Provider Edge Device from the second Provider Edge Device to the first Provider Edge Device;
wherein the second PW ID of the second Provider Edge Device is carried by a MAPPING Message sent by the second Provider Edge Device.

23. A Virtual Private Network, comprising a plurality of first Provider Edge Devices that host a Virtual Switch Instance (VSI), the first Provider Edge Device configures Pseudo Wire (PW) identifications (IDs) and Internet Protocol (IP) address of a second Provider Edge Device that hosts an PW Emulation Edge-to-Edge Virtual Leased Line, determines whether the PW IDs are matched, sets the state of the PW IDs and sends the Forwarding Table;
wherein the PW IDs are IDs specified by the first Provider Edge Device;
and the ID specified for a PW is set to be different from the IDs of other VSIs on the first Provider Edge Device, and is set to be different from other PW IDs assigned by the VSI on the first Provider Edge Device.

24. A Provider Edge Device that hosts a Virtual Switch Instance (VSI), comprising:
an accessing unit adapted to connect a User Edge Device to a Private Network,
a processing unit, adapted to configure Pseudo Wire (PW) identifications (IDs) and Internet Protocol (IP) address of the second Provider Edge Device that hosts an PW Emulation Edge-to-Edge Virtual Leased Line, determine whether the PW IDs are matched, set the state of the PW IDs and deliver the Forwarding Table;
wherein the processing unit comprises:
a PW ID configuration unit, adapted to configure a PW ID for a PW, and IP address of the second Provider Edge Device that hosts an PW Emulation Edge-to-Edge Virtual Leased Line associated with the PW ID;
a PW ID matching unit, adapted to determine whether the configured PW ID is matched with the PW ID carried in the received message;
a PW state set unit, adapted to set the state of the PW according to the match result;
a data delivering unit, adapted to deliver a Forwarding Table according to the state of the PW;
wherein the configured PW ID is an ID specified by the Provider Edge Device that hosts the Virtual Switch Instance;
and the ID configured for the PW is set to be different from the IDs of other VSIs on the Provider Edge Device that hosts the Virtual Switch Instance, and be different from other PW IDs assigned by the VSI on the Provider Edge Device that hosts the Virtual Switch Instance.

25. A method for accessing a Virtual Private Network (VPN) using a Pseudo Wire (PW) Emulation Edge-to-Edge Virtual Leased Line, comprising:
configuring a first PW identification (ID) in a first Provider Edge Device that hosts a Virtual Switch Instance (VSI), and an IP address of a second Provider Edge Device that hosts the PW Emulation Edge-to-Edge Virtual Leased Line associated with the first PW ID;
wherein the first PW ID is an ID specified by the first Provider Edge Device, and the ID specified for a PW is set to be different from the IDs of other VSIs on the first Provider Edge Device, and is set to be different from other PW IDs assigned by the VSI on the first Provider Edge Device;

receiving a second PW ID of the second Provider Edge Device from the second Provider Edge Device;

determining whether the second PW ID of the second Provider Edge Device matches the first PW ID of the first Provider Edge Device, if it matches, setting a state of the PW between the first Provider Edge Device and the second Provider Edge Device; and sending a Forwarding Table to the PW Emulation Edge-to-Edge Virtual Leased Line, to build a bi-directional connection with the VSI.

26. The method of claim 25, wherein the Forwarding Table comprises: destination address, source address and route.

* * * * *

UNITED STATES PATENT AND TRADEMARK OFFICE
CERTIFICATE OF CORRECTION

| | | |
|---|---|---|
| PATENT NO. | : 7,961,738 B2 | Page 1 of 1 |
| APPLICATION NO. | : 12/328972 | |
| DATED | : June 14, 2011 | |
| INVENTOR(S) | : Zhou et al. | |

It is certified that error appears in the above-identified patent and that said Letters Patent is hereby corrected as shown below:

Cover page, in "Abstract," line 4, "an PW" should read -- a PW --.

Signed and Sealed this
Sixteenth Day of August, 2011

David J. Kappos
*Director of the United States Patent and Trademark Office*